(12) United States Patent
Grover

(10) Patent No.: US 7,185,328 B2
(45) Date of Patent: Feb. 27, 2007

(54) SYSTEM AND METHOD FOR IMPROVING A WORKING SET

(75) Inventor: Vinod Kumar Grover, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 574 days.

(21) Appl. No.: 10/160,614

(22) Filed: May 30, 2002

(65) Prior Publication Data

US 2003/0226133 A1    Dec. 4, 2003

(51) Int. Cl.
    *G06F 9/45*    (2006.01)
(52) U.S. Cl. ...................................... 717/156
(58) Field of Classification Search ................ 717/144, 717/153–160; 714/37–38; 706/11, 14; 716/1, 716/10, 18; 709/45; 711/129
    See application file for complete search history.

(56) References Cited

U.S. PATENT DOCUMENTS

| | | | | |
|---|---|---|---|---|
| 4,953,106 | A * | 8/1990 | Gansner et al. | 345/440 |
| 5,457,799 | A * | 10/1995 | Srivastava | 717/160 |
| 5,787,284 | A * | 7/1998 | Blainey et al. | 717/144 |
| 5,850,549 | A * | 12/1998 | Blainey et al. | 717/156 |
| 5,889,999 | A * | 3/1999 | Breternitz et al. | 717/158 |
| 5,950,009 | A * | 9/1999 | Bortnikov et al. | 717/158 |
| 5,963,972 | A * | 10/1999 | Calder et al. | 711/129 |
| 6,175,957 | B1 * | 1/2001 | Ju et al. | 717/156 |
| 6,651,246 | B1 * | 11/2003 | Archambault et al. | 717/160 |

OTHER PUBLICATIONS

*Thirtieth Annual IEEE/ACM International Symposium on Microarchitecture*; IEEE Computer Society; Dec. 1-3, 1997 Research Triangle Park, North Carolina; pp. 303-313.

*28th Annual International Symposium on Computer Architecture* IEEE Computer Society, Jun. 30-Jul. 4, 2001 Sweden; 2001, pp. 155-164.

*Third International Conference on Architectural Support for Programming Languages and Operating Systems*; Apr. 3-6, 1989, Boston, Massachusetts; pp. 183-191.

*ACM SIGPLAN '90 Conference on Programming Language Design and Implementation*; Jun. 20-22, 1990, White Plains, New York; pp. 16-27.

*The Journal Supercomputing*; Special Issu on Instruction-Level Parallelism, Guest Editors: B.R. Rau and J.A. Fisher; vol. 7, No. 1/2, 1993; pp. 230-248.

\* cited by examiner

Primary Examiner—Tuan A. Vu
(74) Attorney, Agent, or Firm—Merchant & Gould P.C.; Ryan T. Grace

(57) ABSTRACT

This invention is directed to a method and system for arranging code blocks of a computer program to reduce paging during the execution of the program. The system comprises an optimizer that receives a compiled computer-executable program in binary format (binary code). After receiving the binary code, the optimizer generates a weighted control flow graph (CFG) and creates a ranked list of edges based on the information disclosed by the weighted CFG. The optimizer then engages in a partitioning process where the blocks associated with each edge are assigned to a particular partition according to the ranking of the edge. The partitioning process then enters into another level by treating each partition as a code block and repartitioning the new code blocks. The optimizer repeats the partitioning process until some threshold number of edges belong to a single partition. Then, the optimizer rearranges the code blocks according to the layout of the blocks in the partition and outputs the optimized computer-executable program.

23 Claims, 9 Drawing Sheets

SYSTEM AND METHOD FOR IMPROVING A WORKING SET

FIELD OF THE INVENTION

This invention relates generally to computer programming tools, and more particularly to computer program code compiling tools.

BACKGROUND OF THE INVENTION

Generally, a computer program is first written in a programming language such as C++ or Java, and is then compiled into a binary code, which may be executed on a computer. When a computer program is being executed on a computer, the binary code is often too large for loading in its entirety into physical memory. To facilitate execution, the binary code may be divided into various sets of code blocks. Certain code blocks that are needed during runtime are loaded into physical memory while other code blocks that are not needed immediately are not loaded into physical memory until needed. This concept is called "virtual memory." A set of code blocks that is loaded into physical memory for program execution is called a working set.

When a particular code block that is not in physical memory is needed during execution of a computer program, a working set that includes the particular code block that is needed is loaded into physical memory. Another working set that is not needed for execution is moved from physical memory to virtual memory to free memory space for the needed working set. This process of swapping working sets between physical memory and virtual memory is called paging. Too much paging is undesirable because it slows down the execution of a computer program.

With existing systems, when a computer program is compiled, a compiler generally does not take into consideration how a computer program is executed. In particular, code blocks are often arranged arbitrarily in a binary code. Consequently, code blocks that are needed sequentially during runtime may not be located in close proximity in memory space, which may result in excessive paging. A method of arranging a binary code to effectively minimize paging eludes those who are skilled in the art.

SUMMARY OF THE INVENTION

This invention is directed to a method and system for arranging code blocks of a computer program to reduce paging during the execution of the program. The system comprises an optimizer that receives a compiled computer-executable program in binary format (binary code). After receiving the binary code, the optimizer generates a weighted control flow graph (CFG) and creates a ranked list of edges based on the information disclosed by the weighted CFG. The optimizer then engages in a partitioning process where the blocks associated with each edge are assigned to a particular partition according to the ranking of the edge. The partitioning process then enters into another level by creating a new graph of partitions. Each partition is treated as a code block, and the original edges are projected to the new code blocks and code blocks are repartitioned again. The optimizer repeats the partitioning process until some threshold number of edges belong to a single partition. In one embodiment, the partitioning process may be repeated until all edges belong to a single partition. Then, the optimizer rearranges the code blocks according to the layout of the blocks in the partition and outputs the optimized computer-executable program.

In one aspect, the invention is directed to a method for rearranging blocks within binary code where two edges in a weighed control flow graph have the same weight (i.e., a "tie-breaker"). The method comprises ranking the two edges based on a size of each edge, where the size of an edge is related to a size of a source code block and a size of a destination code block, corresponding to the edge.

In another aspect, the invention is directed to a method for arranging a binary code where a weighed control flow graph contains loop back edges. The method comprises bias weighting each edge that is a loop back edge before ranking the edges.

Still another aspect of the invention is directed to a computer-readable medium encoded with computer-executable instructions for performing a method of arranging code blocks of a computer program to minimize paging.

A further aspect of the invention is directed to a modulated signal encoded with computer-executable instructions for performing a method of arranging code blocks of a computer program to minimize paging.

DETAILED DESCRIPTION OF THE PREFERRED EMBODIMENT

Briefly stated, this invention provides a method and system for arranging code blocks of a computer program to reduce paging during the execution of the program. This invention minimizes paging by arranging code blocks of binary code according to how the computer program is executed. A multi-level partitioning process is used to improve the working set of the computer program. This invention may be implemented after the computer program has been compiled. These and other aspects of the invention will become apparent to those skilled in the art from the following detailed description.

Illustrative Computing Environment

Figure 1:
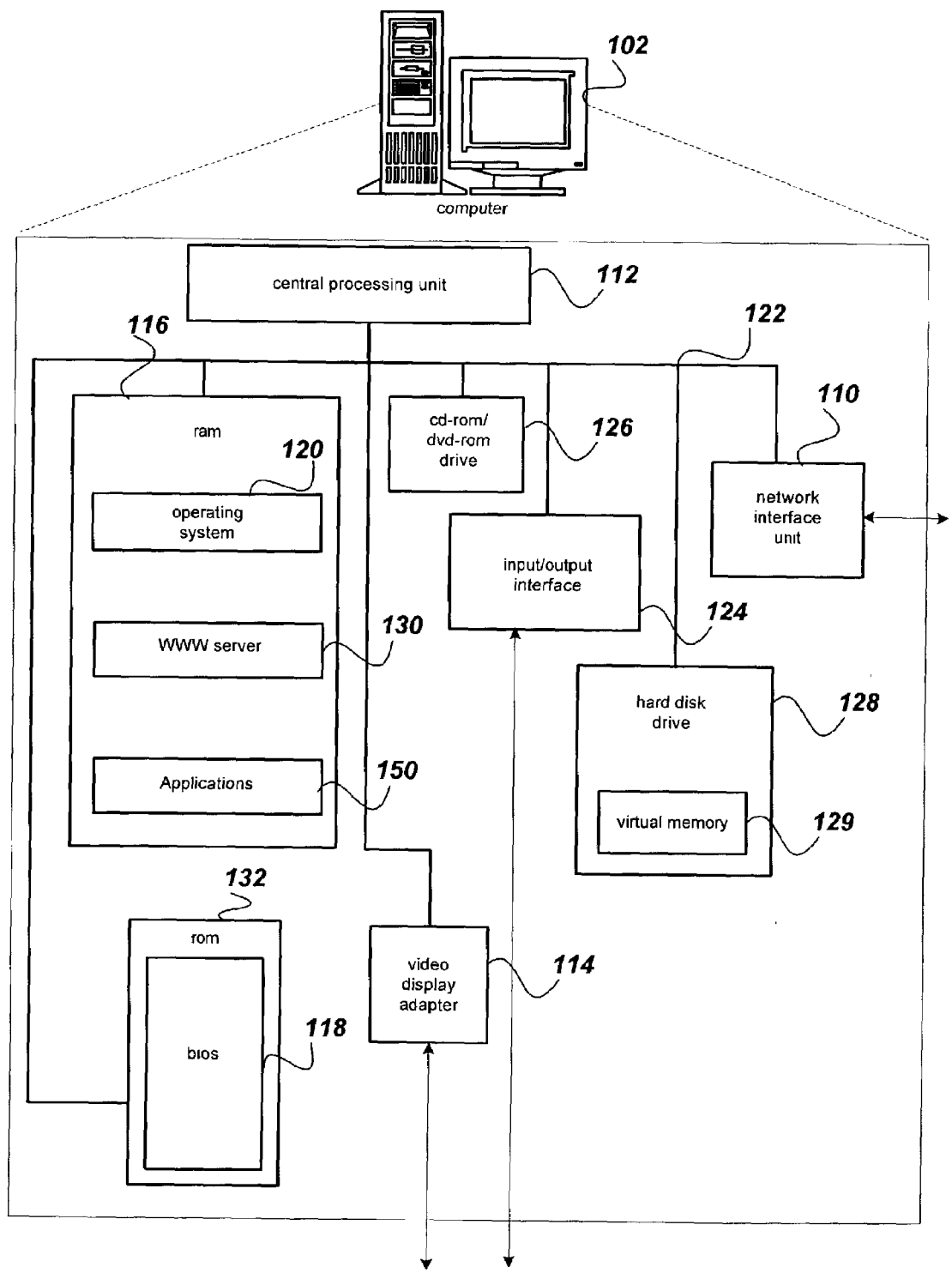
FIG. 1 shows an exemplary computer that may be included in a system implementing this invention, according to one embodiment of the invention.

FIG. 1 and the following discussion are intended to provide a brief general description of a suitable computing environment in which the invention may be implemented. Although not required, this invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that this invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 1 shows an exemplary computer 102 that may be included in a system implementing this invention, according to one embodiment of the invention. In other configurations, computer 102 may include many more components than those shown. Computer 102 includes processing unit 112, video display adapter 114, and a mass memory, all in communication with each other via bus 122. The mass memory generally includes RAM 116, ROM 132, and one or more permanent mass storage devices, such as hard disk drive 128, tape drive, optical drive, and/or floppy disk drive. A portion of hard disk drive 128 may be used as virtual memory 129 to supplement the storage capacity of RAM 116 during the execution of a computer program. The mass memory stores operating system 120 for controlling the operation of computer 102. A general-purpose operating system may be employed. Basic input/output system ("BIOS") 118 is also provided for controlling the low-level operation of computer 102.

As illustrated in FIG. 1, computer 102 may also include network interface 110 for connecting to a network such as local area network (LAN), a wide area network (WAN), such as the Internet, or any other network. Network interface 110 is constructed for use with various communication protocols including the TCP/IP protocol. Communication media between computer 102 and a network typically embodies computer readable instructions, program modules or other data in a modulated data signal such as a carrier wave or other transport mechanism and includes any information delivery media. The term "modulated signal" means a signal that has one or more of its characteristics set or changed in such a manner as to encode information in the signal. By way of example, not limitation, communication media includes wired media such as a wired network or direct-wired connection, and wireless media such as acoustic, RF, infrared and other wireless media. Combinations of any of the above should also be included within the scope of computer readable media.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may store program code and data for providing a web site on a network. More specifically, the mass memory may store web server application program 130, or other application programs 150. These application programs include computer executable instructions which, when executed by computer 102, generate displays and perform the logic described elsewhere in this specification. Computer 102 could also include an SMTP handler application for transmitting and receiving e-mail, an HTTP handler application for receiving and handing HTTP requests, and an HTTPS handler application for handling secure connections. Computer 102 also includes input/output interface 124 for communicating with external devices, such as a mouse, keyboard, scanner, or other input devices not shown in FIG. 1. Likewise, computer 102 may further include additional mass storage facilities such as CD-ROM/DVD-ROM drive 126 and hard disk drive 128. Hard disk drive 128 is utilized by computer 102 to store, among other things, application programs, databases, server applications, and program data.

Figure 2:
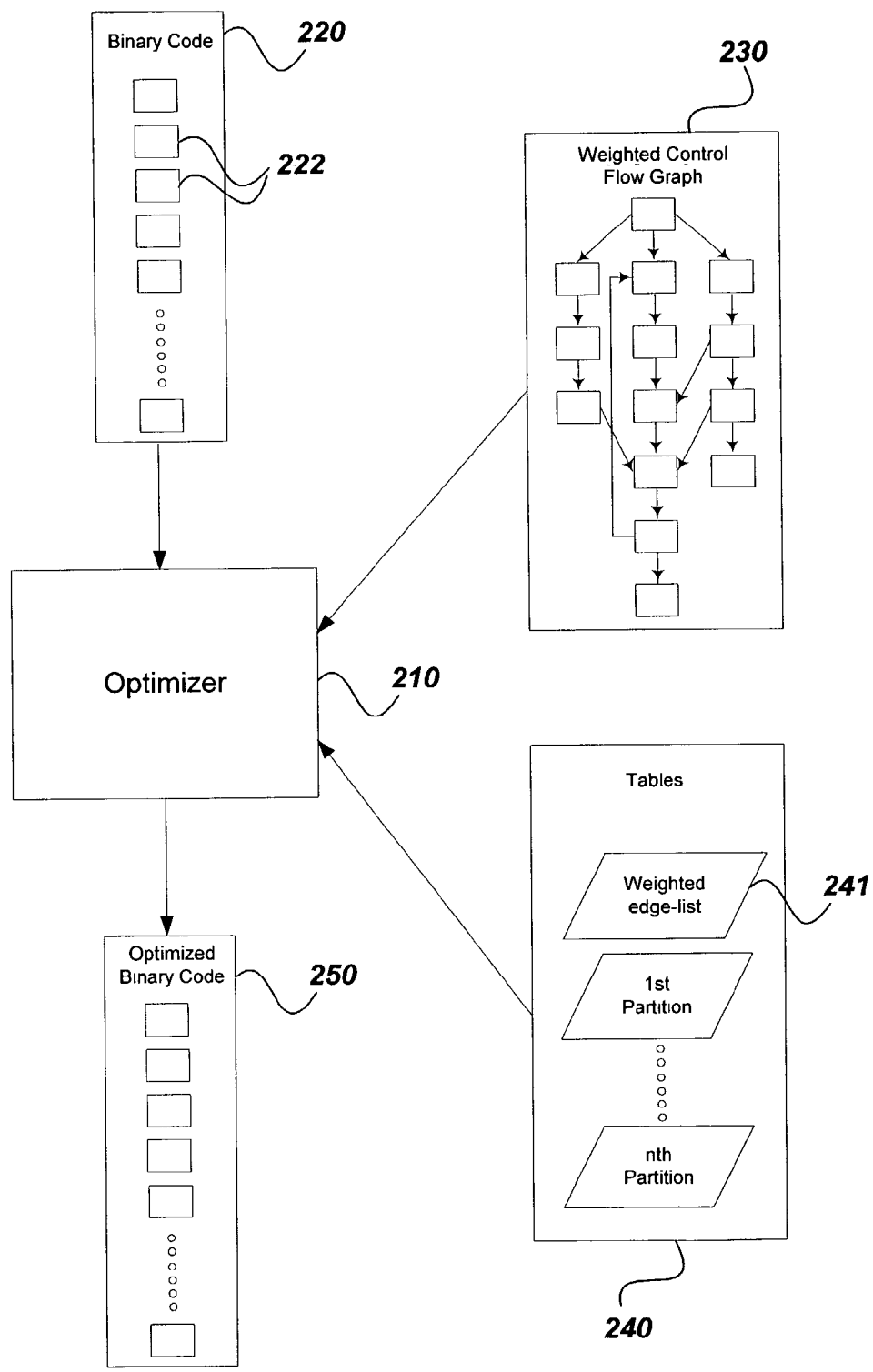
FIG. 2 is a diagram illustrating a general overview of the invention implemented within the computing environment shown in FIG. 1.

FIG. 2 is a diagram illustrating a general overview of the invention implemented within the computing environment shown in FIG. 1. Illustrated is a computer-executable program after the compilation process has been completed. Thus, the computer-executable program includes binary code 220. The binary code 220 typically may be composed of several code blocks 222, which are the smallest atomic unit upon which the binary code 220 may be operated on by a code optimizer. Commonly, the code blocks 222 correspond with what are known as "basic blocks," but may be any atomic unit of the binary code 220.

An optimizer 210 is a computer program that receives compiled computer-executable programs, such as binary code 220, and rearranges the layout of the code blocks 222 to improve the working set of the program. The optimizer 210 outputs an optimized binary code 250, which represents the binary code 220 after its code blocks 222 have been rearranged. The optimizer 210 may be stored in one or more types of mass memory illustrated in FIG. 1, such as RAM 120, CD-ROM/DVD-ROM drive 126 and hard disk drive 128.

The optimizer 210 generates a weighted control flow graph (CFG) 230 based on the binary code 220. The weighted CFG 230 is described in greater detail in conjunction with FIG. 3. Briefly stated, the weighted CFG 230 is a representation of the flow of control from one code block to another code block within the binary code 230. Often, weighted CFGs are constructed empirically by instrumenting the binary code 220 and executing the code to gather the control flow data.

Figure 7:
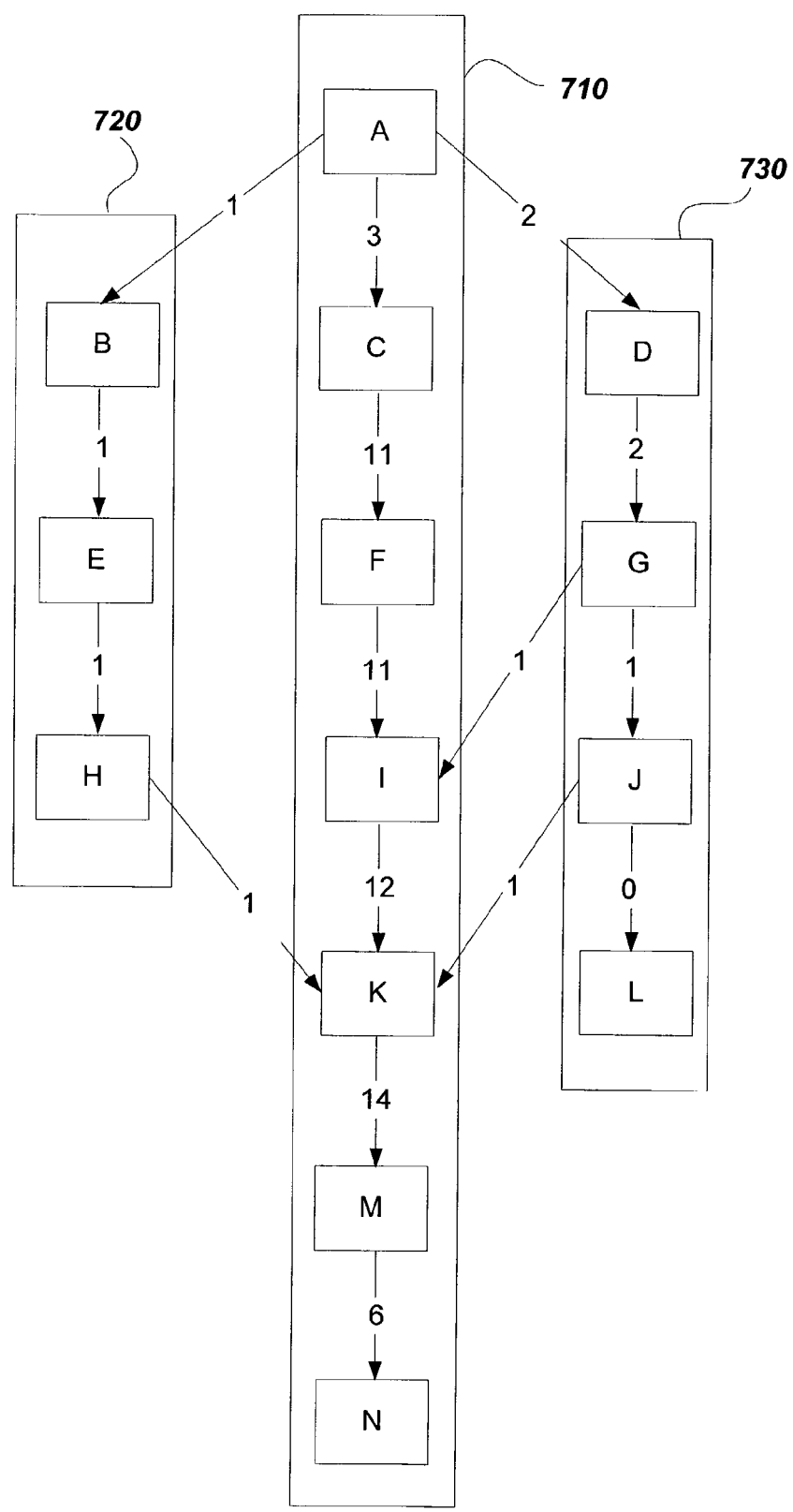
FIG. 7 is a graphical representation of how the procedure described in conjunction with FIG. 6 may be used to create partitions from the weighted CFG illustrated in FIG. 3.

The optimizer 210 is also programmed to generate a plurality of tables 240 based on information disclosed by the weighted CFG 230. One table, a ranked edge list 241, includes a list of each edge in the weighted CFG 230 ranked by the assigned weight. Other tables describe groups of code blocks 222 that are identified as being within the same "partition." As used in this document, the term "partition" means an ordered list of atomic units (e.g., code blocks) or compound code blocks of partitions having a contiguous flow of control. In accordance with the invention, each partition is constructed with reference to the ranked edge list 241 such that edges having greater weights are more likely to be included within the same partition for a given flow of control. FIG. 7 and the related discussion provide an example of how control blocks may be represented by partitions.

Briefly stated, the optimizer 210 uses the tables 240, in conjunction with the weighted CFG 230, to rearrange code blocks 222 of the binary code 220 to output an optimized binary code 250. The optimized binary code 250 has improved working set characteristics over the original binary code 220.

Figure 3:
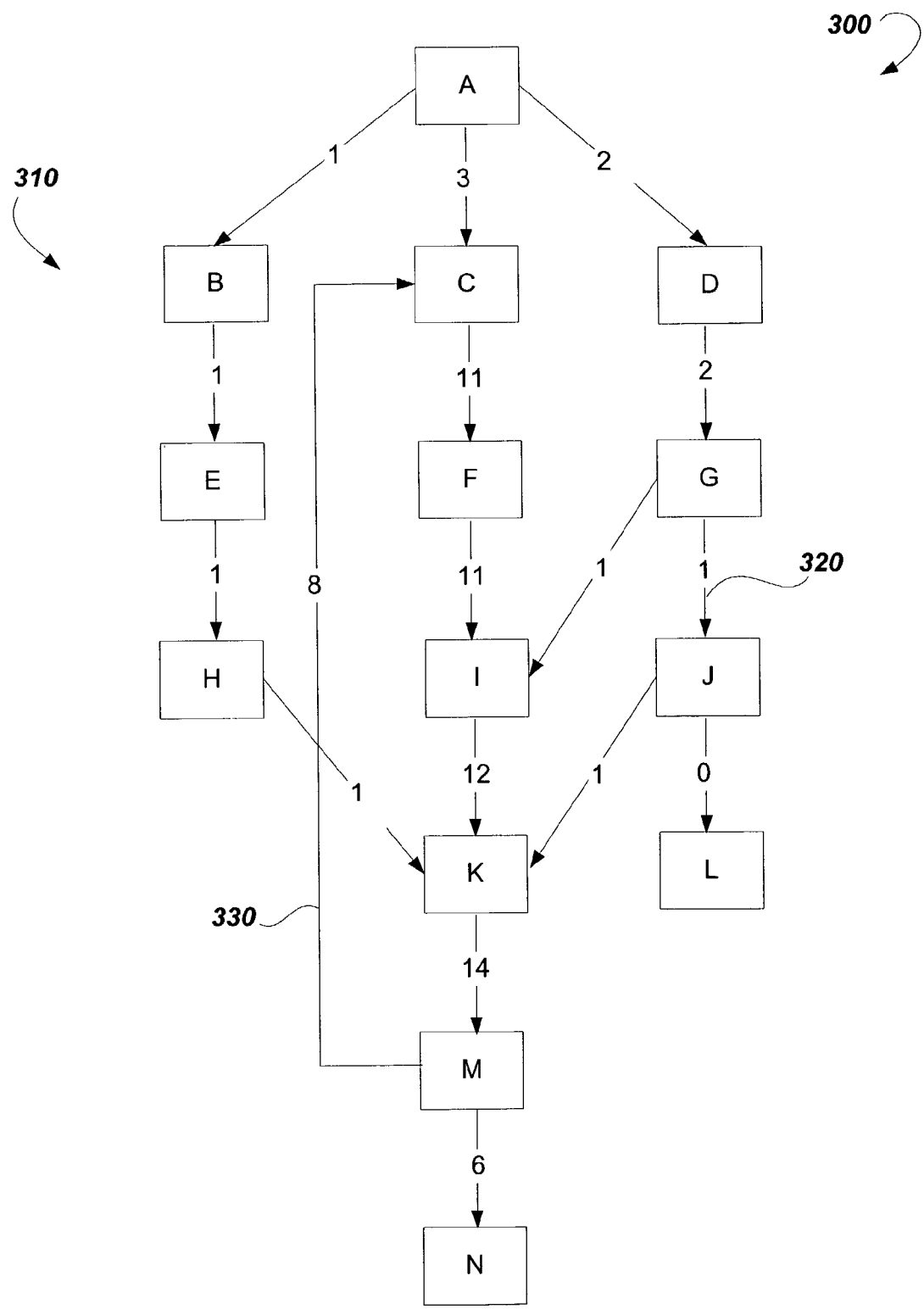
FIG. 3 is an exemplary graphical representation of a weighed control flow graph.

FIG. 3 is an exemplary graphical representation of a weighed control flow graph 300. The binary code of the computer program is divided into a plurality of code blocks 310, such as basic blocks or procedures. The flow of control between code blocks 310 is represented by a plurality of edges, such as edge 320. The weight of an edge represents the affinity of two code blocks that are connected by the edge. In one example, the affinity or weight of an edge between two code blocks may represent the number of times during a given period of execution that the execution control flows from one of the code blocks to the other. A code block may serve as a source code block for multiple edges. For example, code block G has edges that connect with both code block I and code block J. At code block G, the computer program may advance to code block I or code block J depending on whether one or more conditions in G are met. A code block may also serve as the destination block for one or more edges, such as code block K. Depending on the execution of the computer program upstream, code block K may be the destination block for code block I, code block J, or code block H.

Usually, code blocks are connected sequentially, where a first code block is connected to a second code block, which, in turn, is connected to a third code block. However, one code block may be connected to another code block that is located upstream, resulting in a loop-back connection. An example of this connection is the loop-back edge 330 that connects code block M to code block C. Code block C is upstream of a sequence of code block connections that leads to code block M. The loop-back edge 330 causes the sequence of code blocks to repeat due to one or more conditions at code block M.

Figure 4:
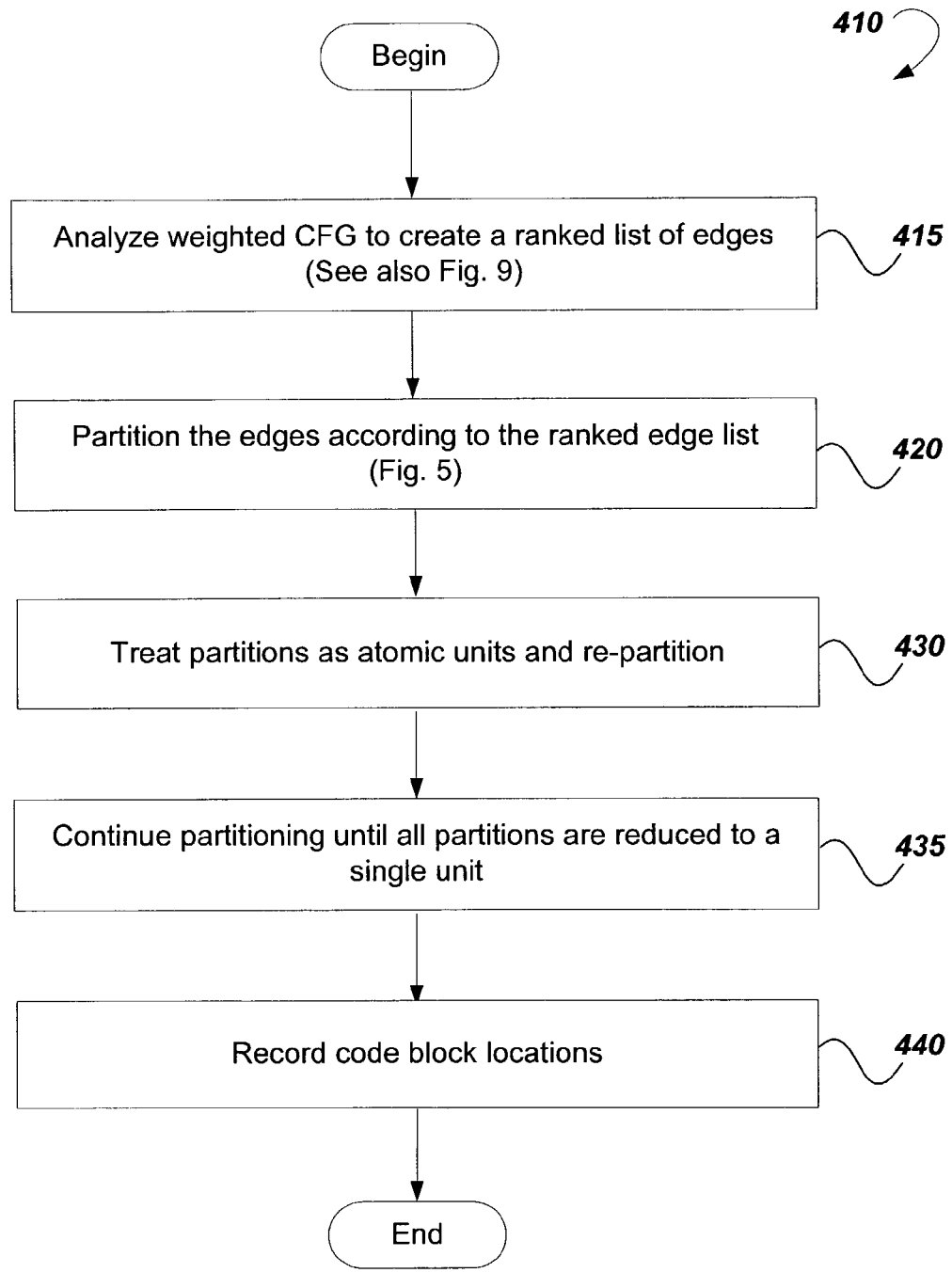
FIG. 4 is a functional block diagram generally illustrating an exemplary optimization process that may be employed by optimizer shown in FIG. 2.

FIG. 4 is a functional block diagram generally illustrating an exemplary optimization process 410 that may be employed by optimizer 210 shown in FIG. 2. The optimization process 410 begins when binary code having multiple code blocks is presented to the optimizer. At block 415, the process analyzes a weighted CFG of the binary code to create a ranked list of edges according to the weights of the edges. For example, referring to the weighted CFG of FIG. 3, a ranked list may include edges in the order KM (weight=14), IK (weight=12), FI (weight=11), CF (weight=11), and so on. If two edges have the same weight, one of the edges may be arbitrarily selected to have a greater weight for the purpose of ranking. Alternatively, the relative weight of edges may be determined based on the size of its corresponding code blocks, as discussed later in conjunction with FIG. 9.

After the ranked list of edges is created, the process 410 moves to block 420 where it partitions the edges according to the ranked list of edges. The partitioning process is discussed in detail below in conjunction with FIG. 6. Briefly stated, in descending order of ranking, the process 410 analyzes each edge to determine whether that edge belongs to the same flow of control as an existing partition, and if so, includes the edge in that partition. If not, a new partition is created with the edge.

At block 430, the process 410 repeats the partitioning block 420 by treating each partition as an atomic unit and repartitioning the new atomic units (i.e., the partitions). In other words, once each edge from the ranked list of edges has been assigned to a partition, the partitions are then treated as code blocks and edges between the partitions are ranked. Then, new (second-level) partitions are created based on the new ranked list. At block 435, the basic partitioning strategy described is repeated until all the partitions are reduced to a single unit. The process 410 moves to block 440 where the code block locations are recorded. Once the locations are recorded, the process 410 ends.

Figure 5:
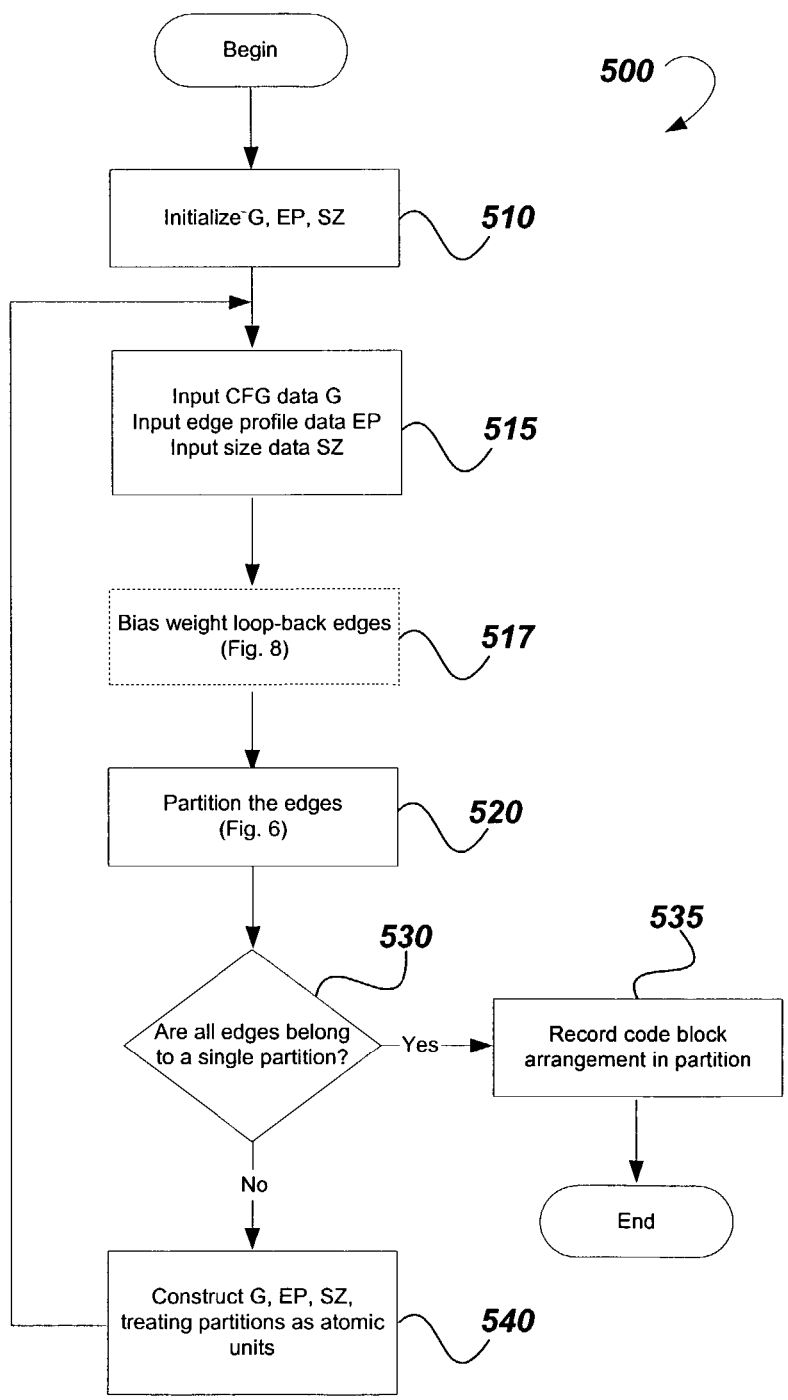
FIG. 5 is an operational flow diagram illustrating in slightly greater detail the optimization process of FIG. 4.

FIG. 5 is an operational flow diagram illustrating in slightly greater detail the optimization process 410 of FIG. 4. Procedure 500 begins at block 510 where CFG G, ranked edge list EP, and code-block size data SZ are initialized for a given binary code. At block 515, G, EP, and SZ are input to the optimizer 210 (FIG. 2). At block 517, optionally (as indicated by the dashed line box), loop-back edges may be bias weighted to give them superior treatment in the ranked list of edges. Loop-back edges often have higher execution count than the execution count of edges within the loop. Bias weighting ensures that the most often executed transition between the loop tail and the loop head is given better locality in code space. An exemplary bias weighting procedure is illustrated later in the discussion of FIG. 8.

Procedure 500 then continues at block 520 where the edges in a weighted CFG of the binary code are partitioned using G, EP, and SZ. A detailed description regarding the partitioning of the edges is shown later in the discussion of FIG. 6. Again, briefly stated, partitioning includes analyzing each edge to determine whether that edge belongs to the same flow of control as an existing partition, and if so, including the edge in that partition. If not, a new partition is created with the edge At decision block 530, a determination is made whether all edges belong to a single partition. If so, then the procedure continues at block 535 where the arrangement of the code blocks in the single remaining partition is recorded and the procedure ends. Otherwise, at block 540, procedure 500 assigns new values to G, EP, and SZ by treating each partition as an atomic unit. The newly assigned G, EP, and SZ are then fed back into the procedure at block 515, and the procedure iterates until all edges belong to a single partition.

Figure 6:
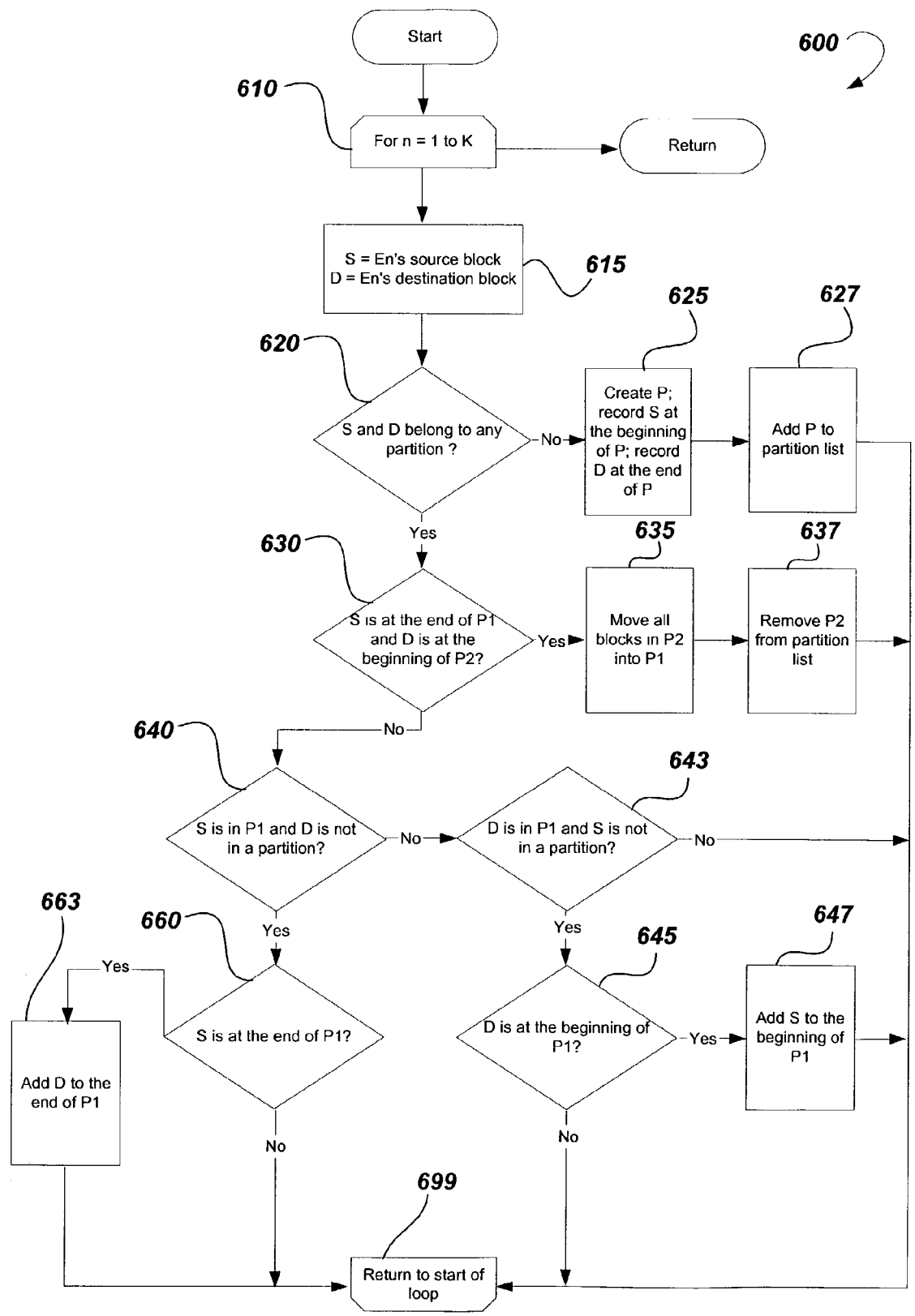
FIG. 6 is an operational flow diagram of an exemplary procedure that implements partitioning of edges.

FIG. 6 is an operational flow diagram of an exemplary procedure 600 that implements partitioning of edges as shown in block 420 of FIG. 4 and block 520 of FIG. 5. Procedure 600 starts with loop start block 610 where a loop begins. The loop repeats K times where K is the number of edges in a ranked edge list. When the loop has repeated K times, procedure 600 returns. In each loop, each of the two atomic units for one of the edges in the ranked edge list is assigned to a partition. Each of the two atomic units may be assigned to different partitions, as will become more clear later. Each edge is handled in order according to its weight. Thus, the first iteration of the loop involves the most weighted edge while the last repetition involves the least weighed edge.

The loop starts at block 615 where a source code block of an edge is assigned to S and a destination code block of the edge is assigned to D, where S and D are variables included here for illustrative purposes. The loop then goes to decision block 620 where a determination is made whether either S or D belong to any partition. If neither S nor D belongs to an existing partition, then the loop continues at block 625 where a new partition, shown as P, is created. S is then recorded at the start of P and D is recorded at the end of P.

The loop then proceeds to block 627 where P is added to a list of partitions. The loop then continues at loop end block 699 and returns to loop start block 610.

Returning to decision block 620, if either S or D belong to a partition, the loop moves to decision block 630, where a determination is made whether S is at the end of the partition, shown as P1 and D is at the beginning of another partition, shown as P2. If so, then partitions P1 and P2 can be joined, so the loop continues at block 635 where the code blocks in P2 are moved into PI, and P2 is removed from the list of partitions (block 637). The loop then increments and repeats.

Returning to decision block 630, if either S is not at the end of P1 or D is not at the beginning of P2, then the loop continues at decision block 640 where it is determined whether S is in P1 and D is not in any existing partition. If so, the loop goes to decision block 660. If not, the loop continues at decision block 643.

At decision block 643, a determination is made whether D is in P1 and S is not in a partition. If not, then both S and D are in some partition but one of them is not at an end of its respective partition. In this case, the loop goes to loop end block 699 and returns to loop start block 610.

Returning to decision at block 643, if the determination is positive, then the loop continues at decision block 645 where a determination is made whether D is at the beginning of P1. If so, the loop continues at block 647 where S is added to the beginning of P1. The loop then increments and repeats.

Returning to decision block 645, if D is not at the beginning of P1, the current edge is not assigned to a partition, and the loop continues at block 699, increments the current edge, and repeats.

Returning to decision block 640, if it is determined that either S is not in P1 or that D is in a partition, then the loop continues at decision block 660. At this block, a determination is made whether S is at the end of P1. If so, the loop moves to block 663 where D is added to the end of P1. The loop then increments and repeats. Otherwise, if S is not at the end of P1, the loop increments and repeats without adding D to the partition P1.

Once each edge in the ranked edge list has been evaluated in the above manner, the initial partitions have been created. As mentioned above, the process of partitioning is repeated using the partitions generated by the first pass through the process as the relevant atomic units.

FIG. 7 is a graphical representation of how the procedure described in conjunction with FIG. 6 may be used to create partitions from the weighted CFG illustrated in FIG. 3. After the partitioning procedure described above has been applied, three partitions (710, 720, and 730) result. Note that each partition represents a contiguous flow of control, and that the first partition tends to include the most weighted code blocks. Thus, if the code blocks are rearranged in an order consistent with the partitioning, the code blocks with the highest affinities should be located more closely, thus improving the working set and reducing paging. These partitions are then treated as atomic units and are further partitioned in another level, according to the operational flow diagram shown in FIG. 5. At this level, edges that are internal to a partition are ignored while edges between partitions are consolidated.

Figure 8:
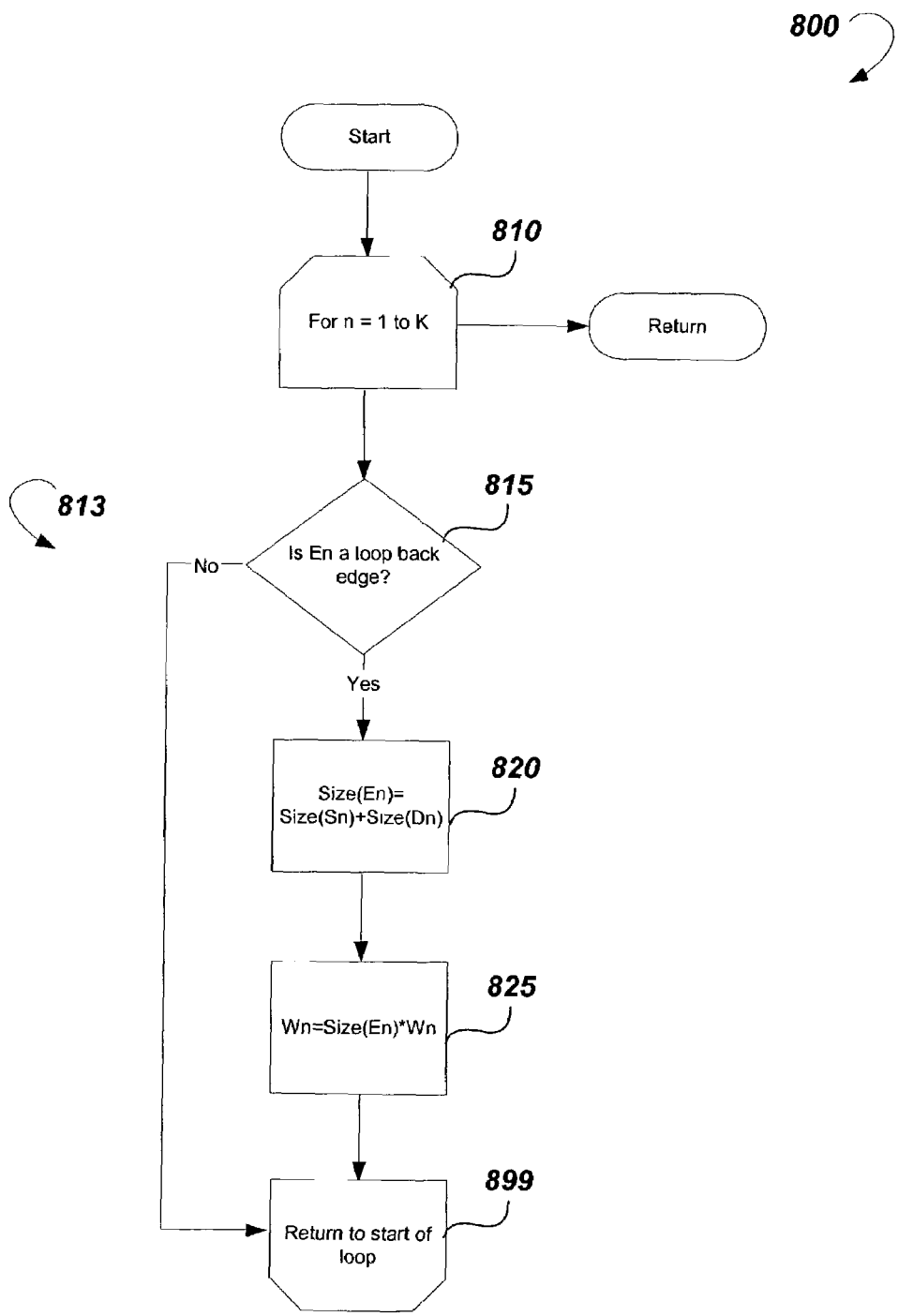
FIG. 8 is an operational flow diagram of an exemplary procedure that implements bias weighting of loop back edges.

FIG. 8 is an operational flow diagram of an exemplary procedure 800 that implements bias weighting of loop back edges, as shown in block 517 of FIG. 5. The procedure starts at loop start block 810 where the loop begins. The loop repeats K times where K is the number of edges in a ranked edge list. When the loop has repeated for K times, procedure 800 returns. In each loop, the weight of a selected edge is increased if the edge is a loop back edge.

The loop starts at decision block 815 where whether the selected edge (En) is a loop back edge is determined. If not, the loop goes to loop end block 899 and returns to loop start block 810, increments, and repeats. Otherwise, if the edge (En) is a loop back edge, the loop continues at block 820 where the size of the edge is determined. The size of a code block relates to the amount of code (e.g., number of instructions) in that block. The size of the edge is the sum of the size of the source block and the destination block of the edge. After the size of the edge is determined, the loop then goes to block 825 where the weight of the edge is modified based on the size of the edge. In this embodiment, the new weight is the edge's old weight multiplied by the size of the edge. The loop then increments and repeats.

Figure 9:
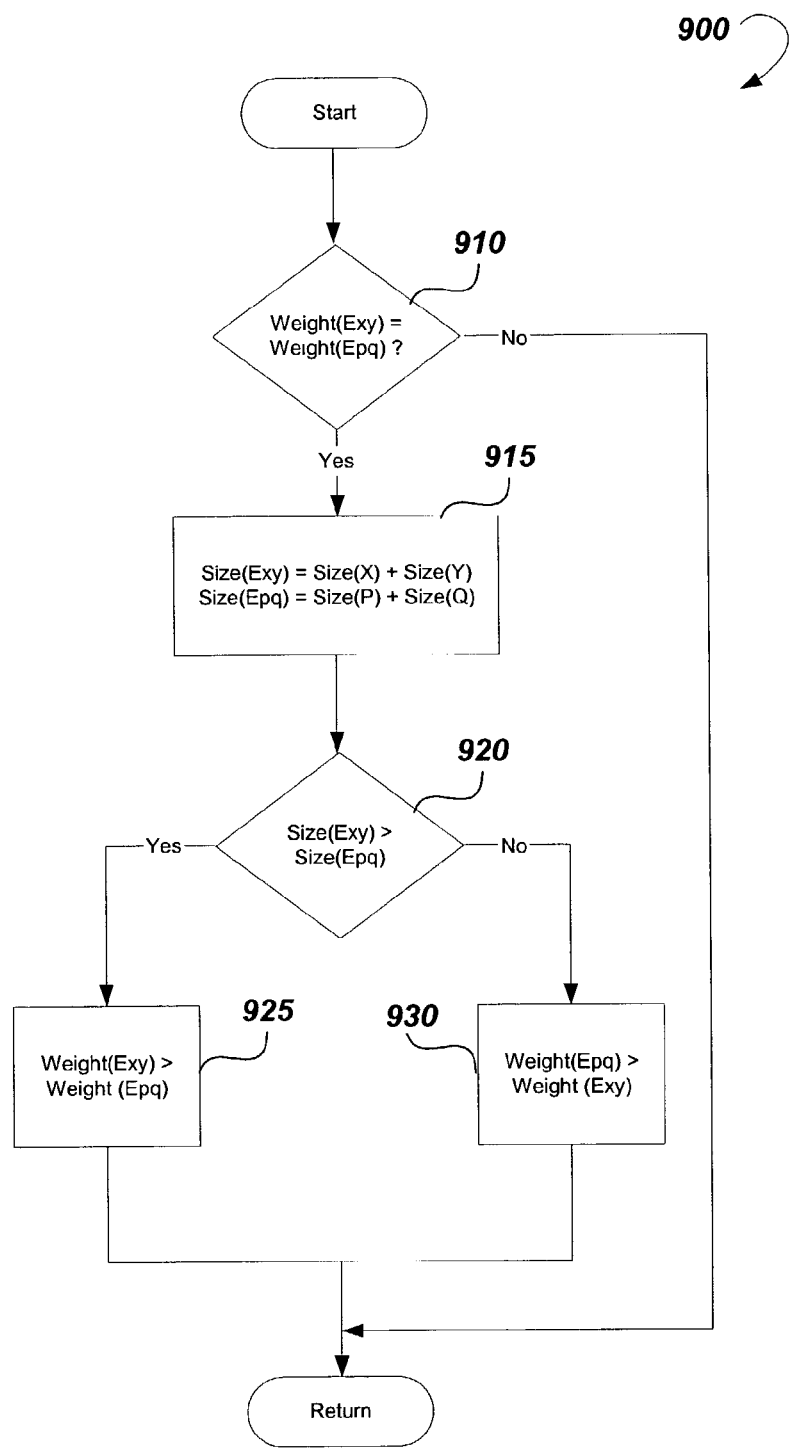
FIG. 9 is an operational flow diagram of an exemplary procedure for ranking two edges that have the same weight.

FIG. 9 is an operational flow diagram of an exemplary procedure 900 for ranking two edges that have the same weight. This procedure may be applied in conjunction with the creation of a ranked list of edges, as shown in block 415 of FIG. 4. The procedure 300 starts at decision block 910 where a determination of whether the weight of a first edge, shown as Exy, is the same as the weight of a second edge, shown as Epq. If not, then the edges are ranked based on their relative weights, and the procedure 900 returns.

If the weights of the edges are the same, procedure 900 goes to block 915 where the sizes of both edges are calculated. Again, as above, the size of each edge is the size of the source block plus the size of the destination block. After the weights of both edges are calculated, the procedure continues at decision block 920 where a determination is made whether the size of the first edge Exy is greater than the second edge Epq. If so, procedure 900 goes to block 925 where the weight of Exy is recorded as greater than the weight of Epq. If not, procedure 900 goes to block 930 where the weight of Epq is recorded as greater than the weight of Exy. The procedure then returns. It will be appreciated that the case is unlikely but possible where the sizes of the two code blocks may be equal. In that case, some other tie-breaker may be used, or one code block may be arbitrarily selected as having a higher ranking.

The above specification, examples and data provide a complete description of the process and system of the invention. Since many embodiments of the invention can be made without departing from the spirit and scope of the invention, the invention resides in the claims hereinafter appended.

I claim:

1. A computer-implemented method for arranging atomic units of binary code of a program, an affinity between each atomic unit being described by edges in a weighted control flow graph representing the binary code, the computer-implemented method comprising:

setting a threshold number of edges for assignment to partitions;

assigning edges between atomic units of binary code;

ranking each of the edges between atomic units by a weight to create a ranked edge list for the atomic units of binary code that is based on the weight, wherein the weight is based on the number of times that an execution control flows between the atomic units of binary code during an execution period;

grouping the edges into partitions in accordance with the weight, wherein the weight is based on the number of times that an execution control flows between the atomic units of binary code during an execution period, wherein each partition is treated as an atomic unit;

assigning edges between the partitions;
ranking the edges between the partitions by a second weight to create a second ranked edge list, wherein ranking the edges between partitions by the second weight is based on the number of times that the execution control flows between the partitions during an execution period;
determining whether the threshold number of edges have been assigned to each of the partitions;
when the threshold number of edges have been assigned to each of the partitions, arranging the partitions in the binary code according to the second ranked edge list and accessing the partitions during the execution of the program; and
when the threshold number of edges have not been assigned to each of the partitions, grouping the edges between the partitions into second partitions in accordance with the second weight, wherein the second weight is based on the number of times that an execution control flows between the second partitions during an execution period, wherein each second partition is treated as an atomic unit.

2. The computer-implemented method of claim 1, further comprising:
ranking the two edges based on a size of each edge when two edges have the same weight, wherein the size of an edge is a sum of sizes of the atomic units associated with the edge.

3. The computer-implemented method of claim 1, further comprising:
arbitrarily ranking one of the two edges higher than the other edge when two edges have the same weight.

4. The computer-implemented method of claim 1, further comprising bias weighting each edge that is a loop back edge.

5. The computer-implemented method of claim 1, wherein the atomic units of the binary code comprises basic blocks.

6. The computer-implemented method of claim 1, wherein the ranked edge list for the atomic units includes each edge ranked from highest weight to lowest weight.

7. The computer-implemented method of claim 1, wherein assigning the edge between the partition comprises:
determining whether both atomic units associated with the edge correspond to existing and different partitions;
determining whether the different partitions are combinable using the edge when both atomic units associated with the edge correspond to existing and different partitions; and
combining the different partitions using the edge.

8. The computer-implemented method of claim 1, wherein assigning the edge between the partition comprises:
determining whether niether of the atomic unit associated with the edge corresponds to an existing partition, and
creating a new partition including the edge when neither of the atomic units associated with the edge correspond to an existing edge.

9. The computer-implemented method of claim 1, wherein assigning the edge between the partition comprises:
determining whether one atomic unit associated with the edge exists at one end of an existing partition, and adding the edge to the one end of the existing partition when the one atomic unit associated with the edge exists at one end of the existing partition.

10. The computer-implemented method of claim 9, wherein the one atomic unit comprises a destination code block and the one end of the existing partition comprises the beginning of the existing partition.

11. The computer-implemented method of claim 9, wherein the one atomic unit comprises a source code block and the one end of the existing partition comprises the end of the existing partition.

12. A computer-readable medium encoded with computer-executable instructions for performing steps, the instructions comprising:
assigning edges to atomic units of binary code of a program;
ranking edges from a weighted control flow graph by a weight to create a ranked edge list, wherein the weight between atomic units of binary code is a number of times that an execution control flows between the atomic units of binary code during an execution period;
grouping the edges into partitions in accordance with the weight, wherein the weight between atomic units of binary code is a number of times that an execution control flows between the atomic units of binary code during an execution period, wherein each partition is treated as an atomic unit;
assigning edges between the partitions, wherein the edges between the partitions are associated with a weight between the partitions, wherein the weight between partitions is the number of times that an execution control flows between the partitions during an execution period;
creating another ranked edge list that describes a weight between each partition in a list of partitions;
performing the assigning step while treating the partitions in the list of partitions as atomic units to create another list of partitions;
repeating the steps of creating another ranked edge list and performing the assigning step until a threshold number of edges have been assigned to the partitions; and
accessing the partitions created from the ranked list based upon the threshold number of edges during the execution of the program.

13. The computer-readable medium of claim 12, further comprising ranking the two edges based on a size of each edge when two edges in the weighted control flow graph have the same weight, wherein the size of an edge is a sum of a size of a source code block and a size of a destination code block, corresponding to the edge.

14. The computer-readable medium of claim 12, further comprising bias weighting each edge that is a loop back edge.

15. The computer-readable medium of claim 12, wherein assigning the edge between the partition comprises:
determining whether both atomic units associated with the edge correspond to existing and different partitions;
determining whether the different partitions are combinable using the edge when both atomic units associated with the edge correspond to existing and different partitions; and
combining the different partitions using the edge.

16. The computer-readable medium of claim 12, wherein assigning the edge between the partition comprises:
determining whether neither of the atomic units associated with the edge correspond to an existing partition, and
creating a new partition including the edge when neither of the atomic units associated with the edge correspond to the existing partition.

17. The computer-readable medium of claim 12, wherein assigning the edge between the partition comprises:
   determining whether one atomic unit associated with the edge exists at one end of an existing partition, and adding the edge to the one end of the existing partition when the one atomic unit associated with the edge exists at the one end of the existing partition.

18. The computer-readable medium of claim 17, wherein the one atomic unit comprises a destination code block and the one end of the existing partition comprises the beginning of the existing partition.

19. The computer-readable medium of claim 17, wherein the one atomic unit comprises a source code block and the one end of the existing partition comprises the end of the existing partition.

20. A computer-readable medium encoded with computer-executable instructions, the instructions comprising:
   setting a threshold number of edges for assignment to partitions;
   assigning edges to atomic units of binary code of a program;
   ranking the edges to atomic units of binary code by a weight to create a ranked edge list for the atomic units, wherein the weight is based on the number of times that an execution control flows between the atomic units of binary code during an execution period;
   grouping the edges into partitions in accordance with the weight, wherein the weight is based on the number of times that the execution control flows between the atomic units of binary code during an execution period, wherein each partition is treated as an atomic unit, wherein the grouping of edges have a contiguous flow of execution control;
   assigning edges between the partitions;
   ranking the edges between the partitions by a second weight to create a second ranked edge list, wherein ranking the edges between partitions by the second weight is based on the number of times that the execution control flows between the partitions during an execution period;
   determining whether the threshold number of edges have been assigned to each of the partitions created by the second weight;
   when the threshold number of edges have been assigned to each of the partitions, arranging the partitions in the binary code according to the second ranked edge list and accessing the partitions during the execution of the program; and
   when the threshold number of edges have not been assigned to each of the partitions, grouping the edges between the partitions into second partitions in accordance with the second weight, wherein the second weight is based on the number of times that an execution control flows between the second partitions during an execution period, wherein each second partition is treated as an atomic unit.

21. The computer-readable medium of claim 20, wherein the atomic units comprise code blocks of binary code.

22. The computer-readable medium of claim 21, wherein the atomic units comprise basic blocks.

23. A computer-implemented method of arranging code blocks within binary code of a program, the method comprising:
   (a) ranking edges in a weighted control flow graph from a most weighted edge to a least weighted edge, wherein the weighted control flow graph represents execution control flow paths among the code blocks, wherein the most weighted edge includes the highest number of times that an execution control flows to the edge during an execution period, wherein the least weighted edge includes the lowest number of times that the execution control flows to the edge during an execution period;
   (b) partitioning the edges;
   (c) treating each partition as an atomic unit and assigning edges between the partitions when the code blocks are partitioned into more than one partition, wherein the edges between the partitions are associated with a weight between the partitions, and iteratively repeating above steps a and b until a single partition exists; and
   (d) accessing the code blocks in the single partition created in step c during the execution of the program.

* * * * *